United States Patent [19]

Bouet

[11] 4,175,367
[45] Nov. 27, 1979

[54] DEVICE FOR FIXING THE KNIVES OF ROTARY MOWERS

[75] Inventor: Jacques E. Bouet, Villeneuve d'Ascq, France

[73] Assignee: International Harvester Company, Chicago, Ill.

[21] Appl. No.: 861,738

[22] Filed: Dec. 19, 1977

[30] Foreign Application Priority Data

Dec. 30, 1976 [FR] France .............................. 76 39557

[51] Int. Cl.² ........................................... A01D 55/18
[52] U.S. Cl. ...................................... 56/295; 56/12.7; 56/192
[58] Field of Search ...................... 56/295, 12.7, 13.6, 56/192

[56] References Cited

U.S. PATENT DOCUMENTS

| | | | |
|---|---|---|---|
| 2,728,181 | 12/1955 | Carpenter | 56/12.7 |
| 2,782,582 | 2/1957 | McClearen | 56/12.7 |
| 3,097,468 | 7/1963 | Johnson | 56/295 |
| 3,208,209 | 9/1965 | Dunlap et al. | 56/295 |
| 3,320,732 | 5/1967 | Kirk | 56/295 |
| 3,715,874 | 2/1973 | Goserud | 56/295 |
| 3,974,630 | 8/1976 | Lely | 56/295 |
| 4,007,578 | 2/1977 | Borstel, Jr. | 56/295 |
| 4,058,959 | 11/1977 | Moss et al. | 56/295 |
| 4,114,354 | 9/1978 | Morris | 56/295 |

FOREIGN PATENT DOCUMENTS

| | | | |
|---|---|---|---|
| 2032206 | 1/1972 | Fed. Rep. of Germany | 56/295 |
| 2058347 | 6/1972 | Fed. Rep. of Germany | 56/295 |
| 906646 | 9/1962 | United Kingdom | 56/295 |

OTHER PUBLICATIONS

F. David AuBuchon Intl. Harvester Co. 401 N. Michigan Ave. Chicago, Ill. 60611

Primary Examiner—Louis G. Mancene
Assistant Examiner—Paul J. Hirsch
Attorney, Agent, or Firm—Dennis K. Sullivan; Neal C. Johnson; F. David AuBuchon

[57] ABSTRACT

A rotary mower is provided with its knives secured to an elastic member and the elastic member is in turn secured to the rotating cutting element, such as a disc, of the mower. This permits the knife to move radially in response to the centrifugal forces on the elastic member. The elastic member preferably has bulged ends which are mounted in housings attached to the cutting element.

2 Claims, 10 Drawing Figures

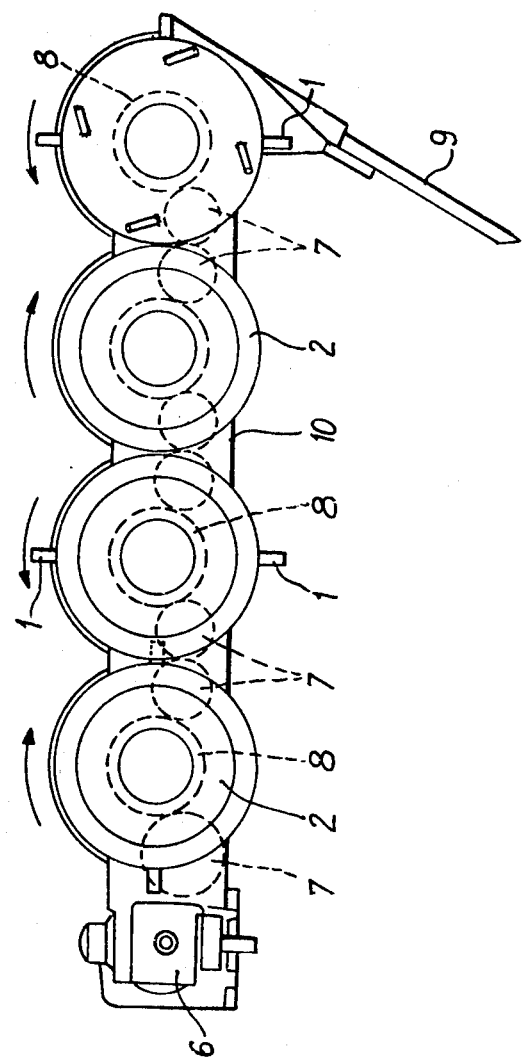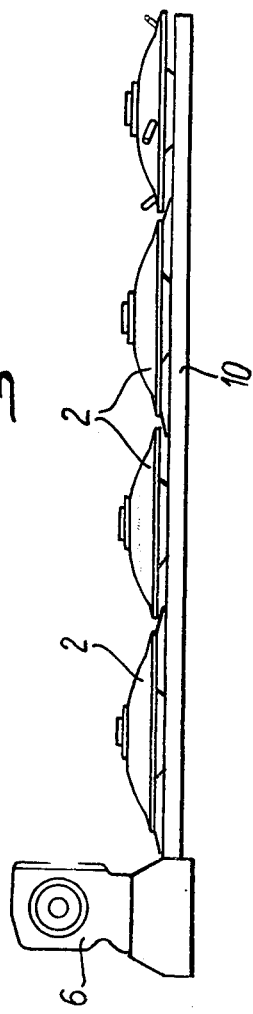

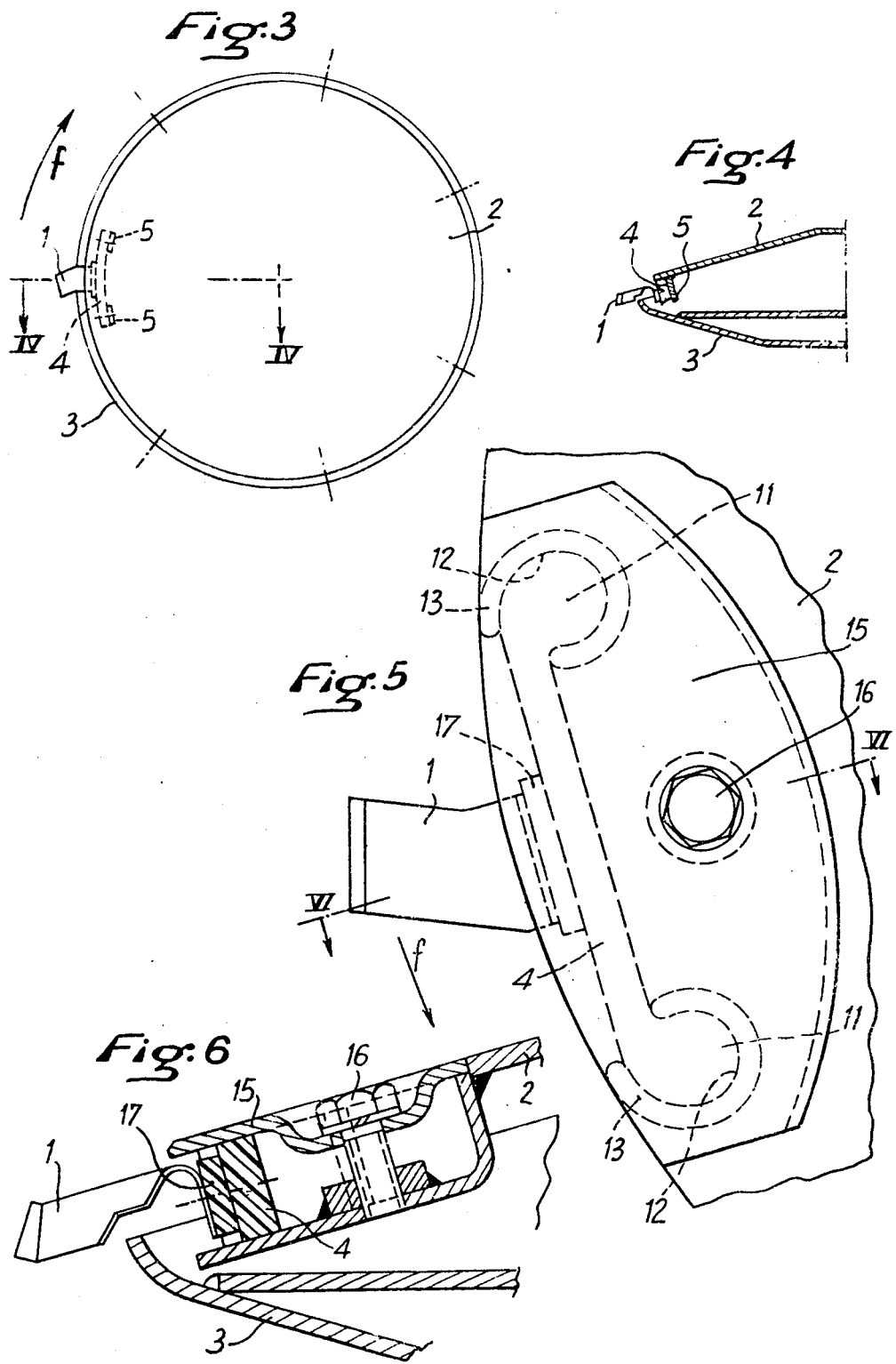

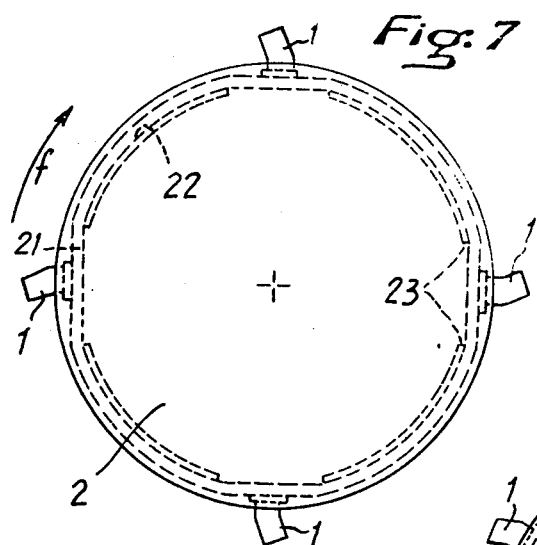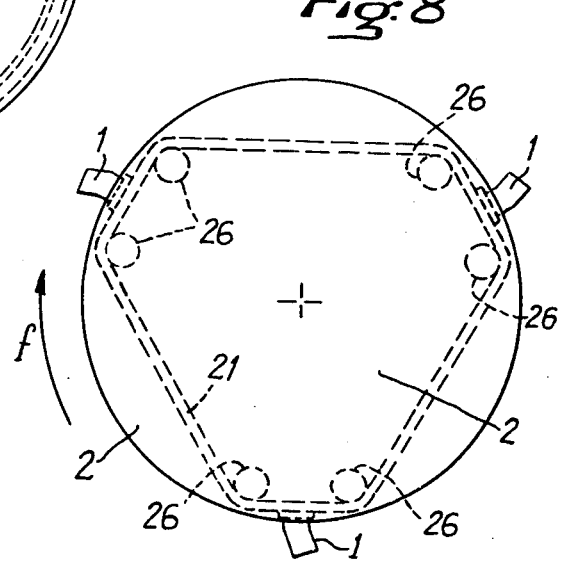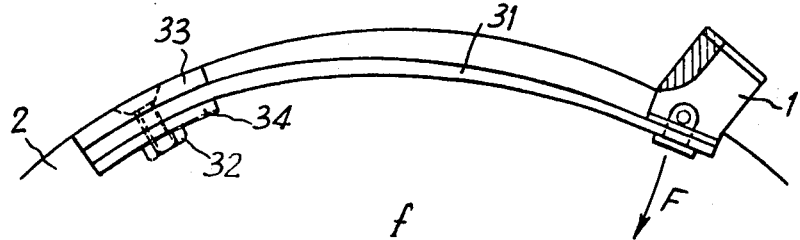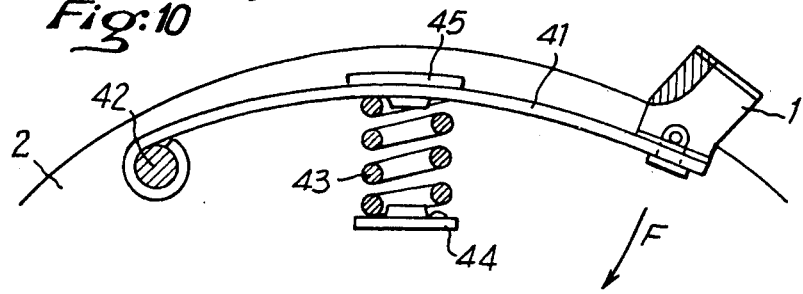

DEVICE FOR FIXING THE KNIVES OF ROTARY MOWERS

This invention relates to mowers of the rotary disc or drum type and more especially to a device for fixing the knives of machines of this type.

In known designs of mowers in which provision is made for rotary cutting elements, each knife is usually mounted for free pivotal motion on a shaft which is substantially parallel to that of the rotary cutting element in order to project from the edge of this latter. It is the actual weight of the knife, in conjunction with a suitable speed of rotation of the cutting element, which has the effect of producing a sufficient knife impact to cut plants. This consequently entails the need to employ knives of substantial thickness. However, after wear of their cutting edges, the knives have considerably lower cutting capacity and this results not only in increased power consumption but leaves the plants in a state of shredded stubble which is liable to inhibit fresh growth.

The aim of the invention is to provide a device for fixing mower knives which is not subject to the disadvantages mentioned in the foregoing.

To this end and in accordance with the invention, each knife is capable of moving with respect to the rotary cutting element in a substantially radial direction and is subjected to the centrifugal action of elastic means.

By means of this arrangement, the knife is endowed with a sufficient degree of rigidity for the cutting operation, with the result that the knife can have a smaller thickness than conventional pivoting knives and can consequently be lighter in weight. If the knife encounters an obstacle, the elastic means yield temporarily and the knife then returns to its initial position without having sustained any damage. It can therefore be stated that the cutting capacity of knives of this type remains practically unimpaired in spite of the wear to which they are normally subject, with the result that the mower is capable of higher performance over a longer period of time.

In certain forms of embodiment in accordance with the invention, each knife is secured to an elastic member whereas in other embodiments, each knife is secured to a rigid element which is capable of moving on the rotary cutting element and is in turn subjected to the action of the elastic means.

A more complete understanding of the invention will be obtained from the following description and from the accompanying drawings which illustrate a few embodiments of a device in accordance with the invention as applied to a disc-type mower, and in which:

FIG. 1 is a general plan view of a rotary disc-type mower;

FIG. 2 is a view in elevation of the mower of FIG. 1;

FIG. 3 is a plan view of a first embodiment of a disc which carries seven knives, only one knife having been illustrated;

FIG. 4 is a vertical axial sectional view taken along line IV—IV of FIG. 3;

FIG. 5 is a partial plan view to a larger scale showing an alternative form of the embodiment shown in FIGS. 3 and 4;

FIG. 6 is a vertical axial sectional view taken along line VI—VI of FIG. 5;

FIGS. 7 and 8 are plan views showing two further alternative forms of the embodiment of FIGS. 3 and 4;

FIGS. 9 and 10 are partial plan views of two further embodiments.

The mower which is shown in FIGS. 1 and 2 comprises in known manner a casing 10 of substantial length which supports cutting plates or discs 2 fitted with knives 1. The discs are driven in rotation from a countershaft drive unit 6 which transmits motion to the discs 2 by means of a gear-train housed within the casing 10. Said gear-train comprises connecting gear-wheels 7 and gear-wheels 8 which are keyed on the disc shafts.

By way of example, the mower is provided with four discs as shown in FIG. 1.

Two gear-wheels 7 are provided between two successive discs 2 in order to ensure that the adjacent discs rotate in opposite directions. Looking in plan, the first and the third discs rotate in the clockwise direction and the second and fourth discs rotate in the anticlockwise direction. The operation of a mower of this type is well known and will not be described.

The cutting unit of a rotary-disc mower as illustrated in FIGS. 3 and 4 essentially comprises knives 1, provision being made for any number greater than two knives per disc, only one of which has been shown in these figures. The knives are fitted at uniform intervals along the periphery of a disc 2 which is rotatably mounted on a stationary portion 3 forming a shield in any suitable and conventional manner (not shown). Each knife 1 is fixed on the central portion of an elastic member 4 having a generally elongated shape in the direction of the periphery of the disc 2. The elastic member 4 is in turn attached at both ends respectively to two lugs 5 which are rigidly fixed to the disc 2 and project from the underface of this latter.

The elastic member 4 is of material such as rubber, for example, and having characteristics such that it is capable of yielding under the action of an obstacle encountered by the knife 1 during rotation of the disc in the direction of the arrow f while nevertheless affording sufficient resistance to maintain the knife in the cutting position when this latter is subjected to normal stresses.

FIGS. 5 and 6 illustrate an alternative form of the embodiment shown in FIGS. 3 and 4, in which each of the two ends of the elastic member 4 is provided with a bulge 11 imprisoned in a housing 12 forming part of a fastening member 13 which is rigidly fixed to the disc 2. By way of example, the bulge 11 has the shape of a portion of cylinder and the housing 12 has a corresponding shape. Said housing is closed at one end by the wall of the disc 2 against which said fastening member is in turn fixed. Said housing is closed at the other end by means of a flange-plate 15 which is removably secured to the disc, for example by means of a screw 16. The knife 1 is mounted on the elastic member 4 either directly or with interposition of a mounting shoe 17 as illustrated in the drawings.

In another embodiment which is illustrated in FIGS. 7 and 8, all the knives 1 are attached to a common elastic member 21 of annular shape which is removably mounted beneath the disc 2. In FIG. 7, the annular elastic member 21 is mounted on a cylindrical surface 22 which is rigidly fixed to the disc 2 and provided with gaps 23, the knives 1 being located opposite to said gaps. Thus the knives can again move towards the center of the disc under the action of an abnormal stress. In FIG. 8, the annular elastic member 21 is mounted on studs 26, said studs being fixed against the underface of the disc 2 and located at intervals along the periphery of this latter, each knife 1 being located opposite to a space formed between two successive studs 26 and being thus capable of moving towards the center of the disc if necessary.

In another form of construction which is illustrated in FIG. 9, the elastic member is constituted by a strip 31 of steel, for example. Said strip extends to the vicinity of the periphery of the disc 2 and is rigidly fixed to this latter at one end, for example by means of a bolt 32 which passes through said end of the strip and through a lug 33 of the disc whilst a strengthening plate 34 is interposed between the nut and the strip. The knife 1 is rigidly fixed at the other end of the elastic strip 31 by any suitable and conventional means. In this arrangement, the knife can also move towards the center of the disc in opposition to the resilient force applied by the strip 31.

Finally, there is shown in FIG. 10 a form of construction in which the knife 1 is not secured directly to the elastic member but to one end of a rigid strip 41 of metal, for example, which extends to the vicinity of the periphery of the disc. The other end of said strip 41 is pivotally mounted on a pin 42 which is rigidly fixed to the disc 2. The elastic means are constituted by a helical compression spring 43 which is applied at one end against an intermediate point of the length of the strip 41 and at the other end against a boss 44 which is rigidly fixed to the disc. A stop 45 which is rigidly fixed to said disc limits the expansion of the spring 43 and determines the work position of the knife in respect of that position of the strip which is farthest from the center of the disc. Excessive centripetal forces exerted on the knife in the direction of the arrow F result in compression of the spring 43 and in a corresponding displacement of the knife towards the axis of the disc, if necessary until complete withdrawal of said knife beneath the disc. The knife returns to its work position after passing over the obstacle.

The invention is clearly not limited to the embodiments which have been described in the foregoing with reference to the accompanying drawings and have been given solely by way of example. Depending on the applications which may be contemplated, many modifications can accordingly be made without thereby departing either from the scope or the spirit of the invention. Similarly, the invention is also applicable to drum-type mowers which are usually provided with a bottom annular flange for mounting the knives, as well as to mowers having either oval or elliptical discs.

I claim:

1. In a rotary mower, a rotary cutting unit comprising a cutting element mounted on said mower for rotation in a generally horizontal plane, a plurality of separate elongated elastomeric members, each having both of its ends attached to said cutting element at circumferentially spaced locations thereon, each of the ends of said elastomeric member comprises a bulge and the cutting element has a housing in which the bulge is imprisoned, and a plurality of cutting knives corresponding to said elastomeric members, each knife being attached to the central portion of its respective elastomeric member in a manner permitting the knife to move substantially radially relative to said cutting element subject to the centrifugal forces acting on said elastomeric member.

2. In a rotary mower, a rotary cutting unit comprising a cutting element mounted on said mower for rotation in a generally horizontal plane, a pair of cylindrically shaped housings fastened to said cutting element at circumferentially spaced locations thereon, one end of said housing being enclosed by the cutting element, an elongated elastomeric member having its ends bulged in the shape of a portion of the cylinder, each of said bulged ends being imprisoned in a respective housing, and a flanged plate removably attached to the cutting element and enclosing the other end of the housing, and a cutting knife attached to the central portion of said elastomeric member in a manner permitting the knife to move substantially radially relative to said cutting element subject due to the centrifugal forces acting on said member.

* * * * *